(12) United States Patent
Moon (10) Patent No.: US 7,385,576 B2
(45) Date of Patent: Jun. 10, 2008

(54) DISPLAY DRIVING DEVICE AND METHOD AND LIQUID CRYSTAL DISPLAY APPARATUS HAVING THE SAME

(75) Inventor: Seung-Hwan Moon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 723 days.

(21) Appl. No.: 10/875,147

(22) Filed: Jun. 23, 2004

(65) Prior Publication Data

US 2004/0257322 A1  Dec. 23, 2004

(30) Foreign Application Priority Data

Jun. 23, 2003  (KR) .................... 10-2003-0040684

(51) Int. Cl.
*G09G 3/36* (2006.01)
(52) U.S. Cl. .................... 345/87; 345/88; 345/89; 345/100
(58) Field of Classification Search ............. 345/87, 345/88, 89, 100
See application file for complete search history.

(56) References Cited

U.S. PATENT DOCUMENTS

| | | | | |
|---|---|---|---|---|
| 5,151,689 | A * | 9/1992 | Kabuto et al. | 345/103 |
| 7,176,990 | B2 * | 2/2007 | Choi et al. | 349/43 |
| 2001/0017607 | A1 | 8/2001 | Kwon et al. | 345/87 |
| 2002/0047827 | A1* | 4/2002 | Koyama et al. | 345/100 |
| 2002/0080107 | A1 | 6/2002 | Fujimoto et al. | 345/87 |
| 2002/0149318 | A1 | 10/2002 | Jeon et al. | 315/169.1 |

FOREIGN PATENT DOCUMENTS

| | | |
|---|---|---|
| EP | 1 017 060 | 7/2000 |
| EP | 1 058 232 | 12/2000 |
| EP | 1 170 720 | 1/2002 |
| FR | 2719936 | 11/1995 |

OTHER PUBLICATIONS

European Search Report dated Apr. 5, 2006 Application No. 04014721.7-2205 (All references cited in the Search Report are cited above).

* cited by examiner

*Primary Examiner*—Richard Hjerpe
*Assistant Examiner*—Leonid Shapiro
(74) *Attorney, Agent, or Firm*—Cantor Colburn LLP (57) ABSTRACT

A liquid crystal display apparatus includes a liquid crystal panel assembly having pixels arranged in a matrix form, which have a first group of pixels and a second group of pixels, gate lines having a first group of gate lines and a second group of gate lines that are connected with the first group of pixels and the second group of pixels, respectively, and data lines each of which is connected with one of the first group of pixels and one of the second group of pixels in every row of the matrix form. The liquid crystal display apparatus also includes a signal controller that receives input image signals and generates two groups of image data, a data driver that receives the two groups of image data and provides data voltages corresponding to the image data to the data lines, and a gate driving unit including a first gate driver that provides first gate-on signals to the first group of gate lines and a second gate driver that provides second gate-on signals to the second group of gate lines.

17 Claims, 5 Drawing Sheets

FIG.6

DISPLAY DRIVING DEVICE AND METHOD AND LIQUID CRYSTAL DISPLAY APPARATUS HAVING THE SAME

BACKGROUND OF THE INVENTION (a) Field of the Invention

The present invention relates to devices for display images, more particularly to, a device and method for driving a display device and a liquid crystal display apparatus employing the same.

(b) Description of the Related Art

Generally, a liquid crystal display (LCD) device includes two panels and a liquid crystal layer with dielectric anisotropy disposed between the two panels. The LCD device displays desired images by controlling an amount of light transmitting the two panels by means of strength of an electric field applied to the liquid crystal layer. The LCD device is one of flat panel display (FPD) devices. TFT-LCD devices having a thin film transistor in a pixel is widely used.

A TFT-LCD device generally includes pixels, gate lines, and data lines. The TFT-LCD device also includes a gate driver, a data driver, and a timing controller. The gate driver applies certain voltage to the gate lines for turning on the switching element, and the gate driver applies data voltages to the data lines for displaying desired images.

The TFT-LCD device uses amorphous silicon or poly silicon as material thereof. Generally, it is easy for a poly silicon TFT-LCD to be integrated on a glass substrate because of high electron mobility. However, since an amorphous silicon (a-Si) TFT-LCD relatively has low electron mobility, it uses a separate driving IC mounting on the glass substrate.

In XGA product, this consists of 1024×3×768 pixels, and thus needs eight data driving ICs of 384 channels and three gate driving ICs of 256 channels or four data driving ICs of 384 channels and six gate driving ICs of 256 channels for driving the TFT-LCD device. Generally, the former is a single bank driving and the latter is a dual bank driving.

In the latter case, there are some problems in that a shift speed of shift registers is doubled in proportion to the number of the gate drivers. Also, there is a problem such that the gate driving ICs cannot be mounted on one side of the liquid crystal panel since the gate line pitch is three times as large as the date line pitch.

SUMMARY OF THE INVENTION

The above mentioned and other drawbacks and deficiencies of the prior art are overcome or alleviated by a display driving device and a liquid crystal display device employing the same according to the present invention. In one embodiment, a liquid crystal display apparatus comprises a liquid crystal panel assembly including pixels arranged in a matrix form, which have a first group of pixels and a second group of pixels, gate lines having a first group of gate lines and a second group of gate lines that are connected with the first group of pixels and the second group of pixels, respectively, and data lines each of which is connected with one of the first group of pixels and one of the second group of pixels in every row of the matrix form. The liquid crystal display apparatus also includes a signal controller that receives input image signals and generates two groups of image data, a data driver that receives the two groups of image data and provides data voltages corresponding to the image data to the data lines, and a gate driving unit including a first gate driver that provides first gate-on signals to the first group of gate lines and a second gate driver that provides second gate-on signals to the second group of gate lines.

Each of the second group of pixels is disposed between adjacent ones of the first group of pixels in every row of the matrix form. The first and second gate drivers each include shift registers each of which has an input connected to an output of a previous one of the shift registers and another input connected to an output of a following one of the shift registers. The shift registers each receive at least one clock. The shift registers each include an SR latch having inputs connected to the outputs, respectively, of the previous and following shift registers, and an AND gate having an input connected to an output of the SR latch and another input receiving a clock.

The signal controller generates a first group of control signals being applied to the first gate driver, and a second group of control signals being applied to the second gate driver. The first group of control signals are each overlapped with corresponding one of the second group of control signals for a predetermined time interval. The first and second groups of control signals include a vertical synchronization start signal and clocks having a different phase. The vertical synchronization start signal is overlapped with the clocks for a predetermined time interval. The odd and even data are applied to the data driver during a half horizontal period, and the odd and even data have an opposite polarity. The pixels have switching elements, and the first and second gate drivers and the switching elements are formed on a same substrate.

In another embodiment, a display driving device comprises a signal controller that generates first and second groups of control signals and divides input image signals into two groups of image data, data drivers that are supplied with the two groups of image data and output data voltages corresponding to the two groups of image data, and gate drivers each including shift registers each of which is supplied with the first and second groups of control signals and at least one output of an adjacent one of the shift registers to output a gate-on signal. The first and second groups of control signals each have a vertical synchronization start signal and at least one clock, and the first group of control signals are each overlapped with corresponding one of the second group of control signals for a predetermined time interval. The gate drivers include first and second groups of gate drivers, and the first and second groups of gate drivers are disposed at opposing regions with respect to each other.

In another embodiment, a method of driving a liquid crystal display device includes providing first gate-on signals via a first group of gate lines and second gate-on signals via a second group of gate lines, providing data voltages via data lines, providing control signals and clock signals to a first gate driver providing the first gate-on signal to the first group of gate lines, providing the control signals and the clock signals to a second gate driver providing the second gate-on signals to the second group of gate lines about a half horizontal period after providing the control signals and the clock signals to a first gate driver, providing the first gate-on signals to a first group of switching elements connected to the data lines, providing the second gate-on signals to a second group of switching elements connected to the date lines about a half horizontal period after providing the first gate-on signals to a first group of switching elements, and providing the data voltages to the first and second group of switching elements.

These and other objects, features and advantages of the present invention will become apparent from the following detailed description of illustrative embodiments thereof, which is to be read in connection with the accompanying drawings.

The present application claims priority from Korean Patent Application No. 2003-40684, filed on Jun. 23, 2003, the disclosure of which is hereby incorporated herein by reference its entirety.

BRIEF DESCRIPTION OF THE DRAWINGS

The above and other advantages of the present invention will become more apparent by describing in detail embodiments thereof with reference to the accompanying drawings, in which.

DETAILED DESCRIPTION OF THE INVENTION

Detailed illustrative embodiments of the present invention are disclosed herein. However, specific structural and functional details disclosed herein are merely representative for purposes of describing exemplary embodiments of the present invention.

Figure 1:
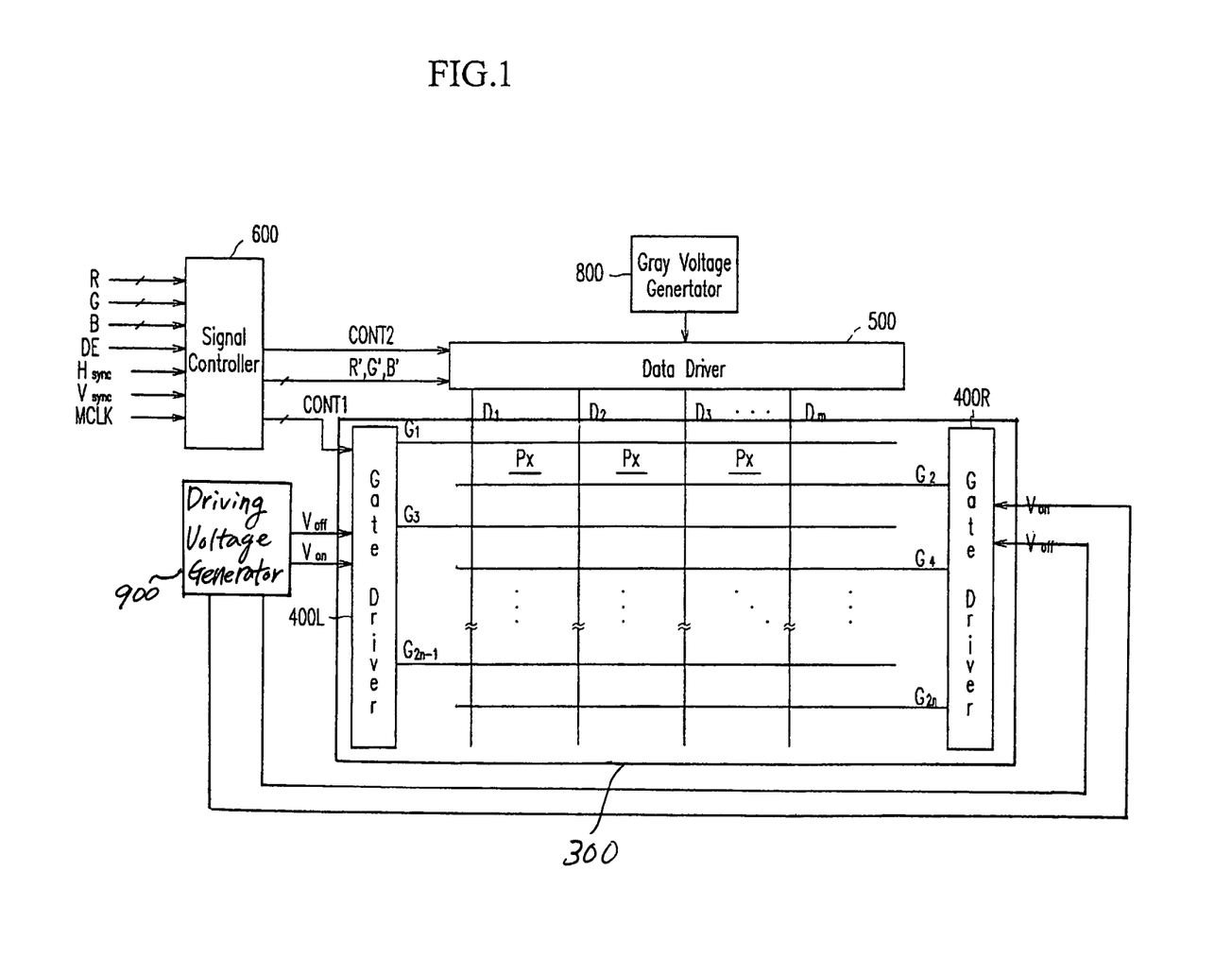
FIG. 1 is a block diagram of an LCD device according to an embodiment of the present invention.
Figure 2:
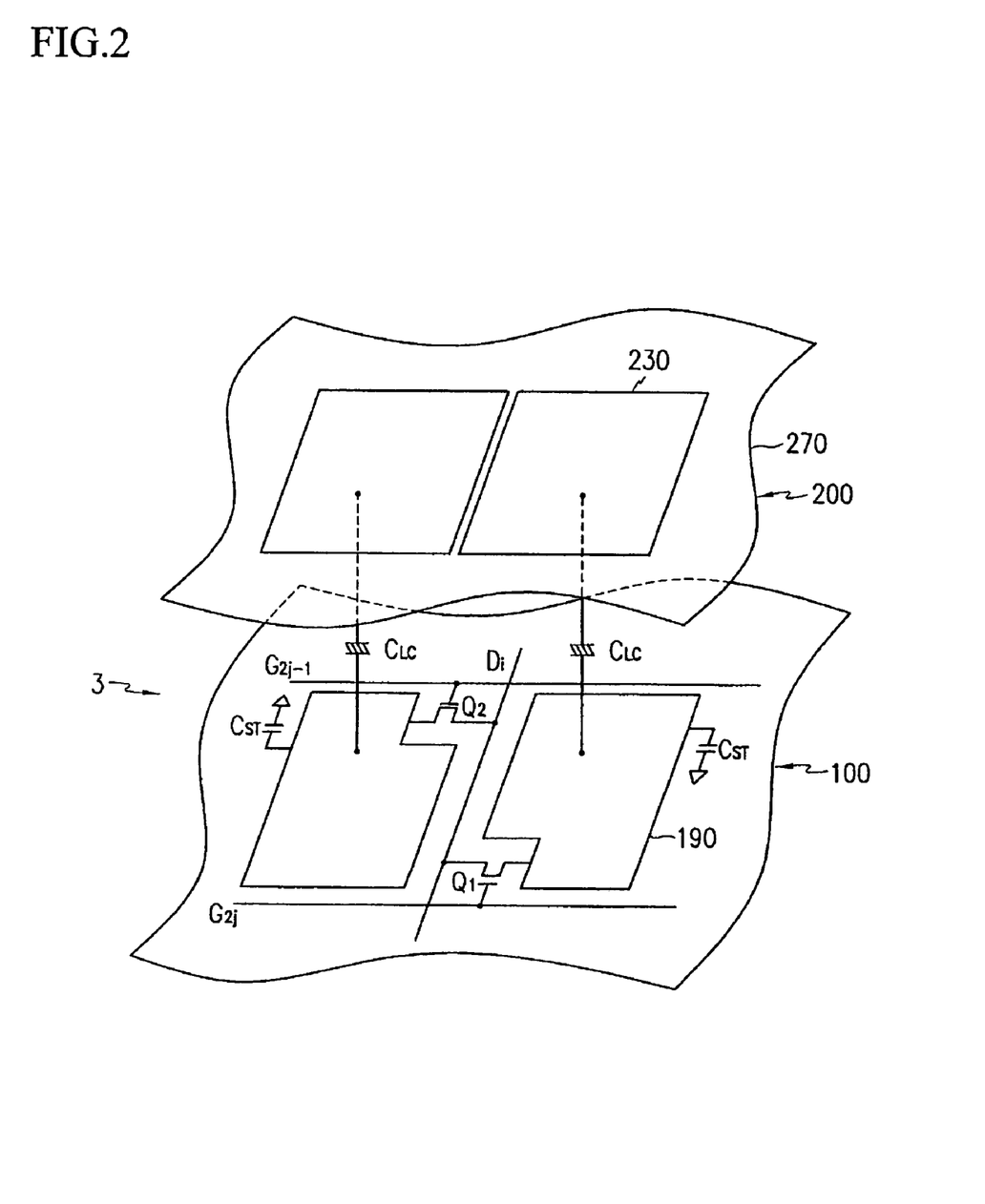
FIG. 2 is an equivalent circuit diagram of a pixel of the LCD device in FIG. 1.

FIG. 1 is a block diagram of a liquid crystal display (LCD) device according to an embodiment of the present invention, and FIG. 2 is an equivalent circuit diagram of a pixel of the LCD device in FIG. 1. Referring to FIG. 1, the LCD device includes a liquid crystal (LC) panel assembly 300, a gate driver 400L and 400R, a data driver 500, a gray voltage generator 800 connected to the data driver 500, a driving voltage generator 900 connected to the gate driver 400L and 400R, and a signal controller 600.

The LC panel assembly 300 includes display signal lines $G_1$-$G_n$ and $D_1$-$D_m$ and pixels Px connected thereto and arranged in a matrix form. The display signal lines $G_1$-$G_n$ and $D_1$-$D_m$ include gate lines $G_1$-$G_n$ transmitting gate signals (or scanning signals) and data lines $D_1$-$D_m$ transmitting data signals. The gate lines $G_1$-$G_n$ extend in a row direction and are substantially parallel to each other, and the data lines $D_1$-$D_m$ extend in a column direction and are substantially parallel to each other.

Each pixel includes one of switching elements $Q_1$ and $Q_2$ connected to the display signal lines $G_1$-$G_n$ and $D_1$-$D_m$, an LC capacitor $C_{LC}$, and a storage capacitor $C_{ST}$. The storage capacitor $C_{ST}$ may be omitted if unnecessary. The switching elements $Q_1$, and $Q_2$, such as a thin film transistor (TFT), are provided on a lower panel 100 and has three terminals: a control terminal connected to one of the gate lines $G_1$-$G_n$; an input terminal connected to one of the data lines $D_1$-$D_m$; and an output terminal connected to a pixel electrode 190. Furthermore, the switching elements Q1 and Q2 are in turn connected to left and right side of one of data lines D1-Dm.

The LC capacitor $C_{LC}$ includes the pixel electrode 190 on the lower panel 100, a common electrode 270 on a upper panel 200, and the LC layer 3 as a dielectric between the electrodes 190 and 270. The pixel electrode 190 is connected to the switching elements Q1 and Q2, and the common electrode 270 covers the entire surface of the upper panel 100 and is supplied with a common voltage Vcom. Alternatively, both the pixel electrode 190 and the common electrode 270, which have shapes of bars or stripes, are provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of three primary colors such as red, green and blue colors or sequentially represents the three primary colors in time, thereby obtaining a desired color. FIG. 2 shows an example that each pixel includes a color filter 230 representing one of the three primary colors in an area of the upper panel 200 facing its pixel electrode 190. Alternatively, the color filter 230 is provided on or under the pixel electrode 190 on the lower panel 100. A polarizer (not shown) polarizing the light is attached on outer side of at least one of the two panels 100 and 200.

The gray voltage generator 800 generates two sets of gray voltages related to transmittance of the pixels. The gray voltages in one set have a positive polarity with respect to the common voltage Vcom, while those in the other set have a negative polarity with respect to the common voltage Vcom.

The gate drivers 400L and 400R are arranged on left and right side of the LC panel assembly 300 and are respectively connected to the odd gate lines $G_1$, $G_3$, ... ,$G_{2n-1}$ and the even gate lines $G_2$, $G_4$, ..., $G_{2n}$. Further, the gate drivers 400L and 400R synthesize the gate-on voltage Von and the gate-off voltage Voff from the driving voltage generator 900 to generate gate signals for application to the gate lines $G_1$-$G_n$.

The data driver 500 is connected to the data lines $D_1$-$D_m$ of the LC panel assembly 300 and applies data voltages selected from the gray voltages supplied from the gray voltage generator 800 to the data lines $D_1$-$D_m$.

According to another embodiment of the present invention, the IC chips of the gate drivers 400L and 400R and/or the data driver 500 are mounted on the lower panel 100. Further, one or more of the drivers 400L and 400R and 500 are incorporated along with other elements into the lower panel 100. The gate PCB and/or the gate FPC films may be omitted in both the cases.

Now, operation of the LCD device will be described in detail. The signal controller 600 is supplied with RGB image signals R, G and B and input control signals controlling the display thereof such as a vertical synchronization signal Vsync, a horizontal synchronization signal Hsync, a main clock MCLK, and a data enable signal DE, from an external graphic controller (not shown). After generating gate control signals CONT1 and data control signals CONT2 and processing the image signals R, G and B suitable for operation of the LC panel assembly 300 on the basis of the input control signals, the signal controller 600 provides the gate control signals CONT1 for the gate drivers 400L and 400R, the processed image signals R', G' and B' and the data control signals CONT2 for the data driver 500. The gate control signals CONT1 include a vertical synchronization start signal STV for informing start of a frame, a gate clock signal CPV for controlling an output time of the gate-on voltage Von, and an output enable signal OE for defining width of the gate-on voltage Von. The data control signals CONT2 include a horizontal synchronization start signal STH for informing start of a horizontal period, a load signal LOAD or TP for instructing to apply data voltages to the data lines $D_1$-$D_m$, an inversion control signal RVS for reversing polarity of the data voltages (with respect to the common voltage Vcom) and a data clock signal HCLK.

The data driver 500 receives the image data R', G' and B' from the signal controller 600 and converts the image data R', G' and B' into analogue data voltages selected from the gray voltages supplied from the gray voltage generator 800 in response to the data control signals CONT2 from the signal controller 600.

Responsive to the gate control signals CONT1 from the signals controller 600, the gate driver 400 applies the gate-on voltage Von to the gate line $G_1$-$G_n$, thereby turning on the switching elements Q1 and Q2 connected thereto.

The data driver 500 applies the data voltages to the corresponding data lines $D_1$-$D_m$ for a turn-on time of the switching elements Q (which is called "one horizontal period" or "1 H" and equals to one period of the horizontal synchronization signal Hsync, the data enable signal DE, and the gate clock signal CPV). Then, the data voltages are sequentially supplied to the corresponding pixels via the turned-on switching elements Q1 and Q2.

Difference between the data voltage and the common voltage Vcom applied to a pixel is expressed as a charged voltage of the LC capacitor $C_{LC}$, i.e., a pixel voltage. The liquid crystal molecules have orientations depending on magnitude of the pixel voltage and the orientations determine the polarization of light passing through the LC capacitor $C_{LC}$. The polarizers convert the light polarization into the light transmittance.

By repeating this procedure, all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that polarity of the data voltages is reversed (which is called "frame inversion"). The inversion control signal RVS may be also controlled such that polarity of the data voltages flowing in a data line in one frame are reversed (which is called "line inversion"), or polarity of the data voltages in one packet are reversed (which is called "dot inversion").

Now, a configuration and operation of the gate driver according to an embodiment of the present invention will be described more in detail with reference to FIG. 3 to FIG. 5.

Figure 3A:
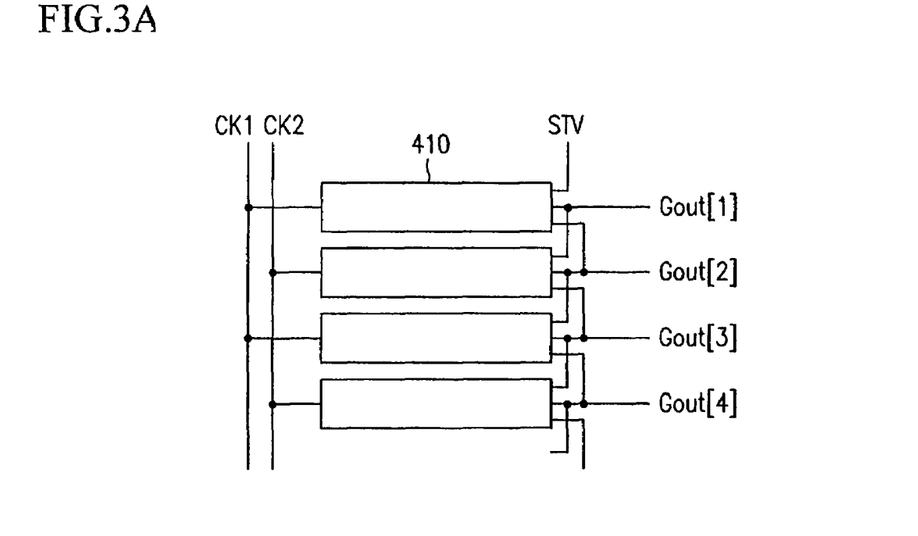
FIG. 3A is a block diagram of a gate driver according to an embodiment of the present invention.
Figure 3B:
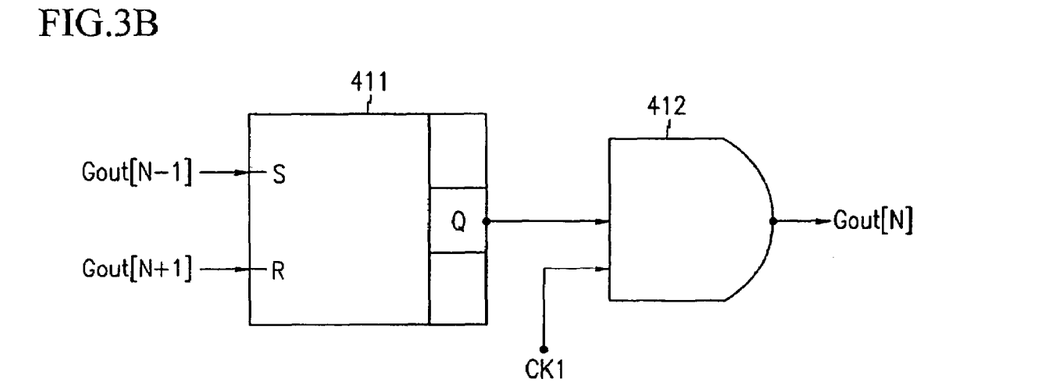
FIG. 3B is an equivalent circuit diagram of the shift register in FIG. 3A.
Figure 4:
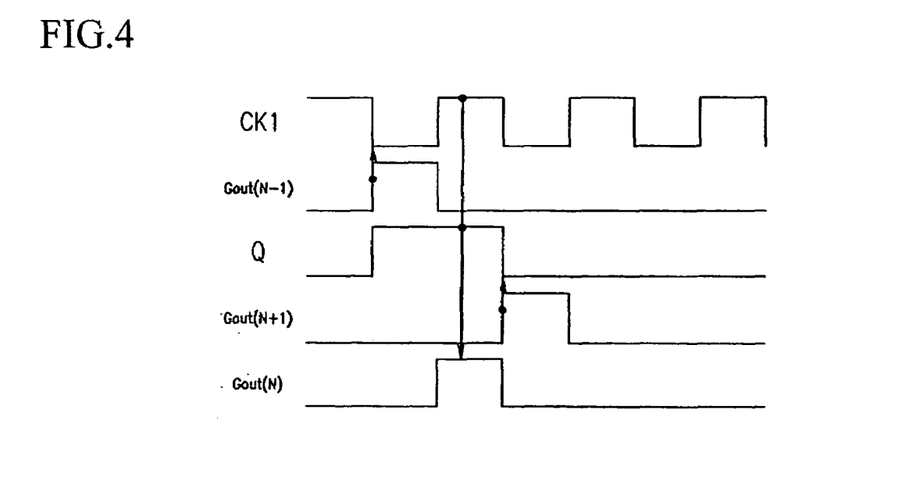
FIG. 4 is a waveform diagram for illustrating operation of the shift register in FIG. 3B.

FIG. 3A is a block diagram of a gate driver according to an embodiment of the present invention, and FIG. 3B is an equivalent circuit diagram of the shift register shown in FIG. 3A. FIG. 4 is a signal waveforms diagram for illustrating operation of the gate driver shown in FIG. 3.

As shown in FIG. 3A, the gate drivers 400L and 400R include a plurality of shift registers. In this case, the shift register 410 may be integrated on the same substrate together when the switching elements of the pixels are formed thereon. For example, gate driving ICs are not used, but they are integrated on the LC panel assembly 300.

The shift register 410, as shown in FIG. 3B, may be represented as a SR latch 411 and an AND gate 412. The gate drivers 400L and 400R begin to output the gate-on voltage Von in response to the vertical synchronization start signal STV from the signal controller 600. The first shift register 410 begins to output the gate-on voltage Von in synchronization with the vertical synchronization start signal STV and a clock signal CK1, and remainder of the shift registers 410 begin to output the gate-on voltage Von in synchronization with an output voltage of the previous shift register and one of the clock signals CK1 and CK2.

Operation of the shift register 410 will be described in detail. The SR latch 411 includes a set terminal S which receives a gate output Gout(N−1) of output of the previous shift register and a reset terminal R which receives a gate output Gout(N+1) of output of the following shift register. The AND gate 412 generates a gate signal using the output of the SR latch 411 and the clock signal CK1.

In case that both the gate output Gout(N−1) inputted to the set terminal S and the gate output Gout(N+1) inputted to the reset terminal R are in a low state, the output of the SR latch 411 is in a low (0) state, too. While the gate output Gout(N+1) remains in a low state, the gate output Gout(N−1) changes to a high (1) state, then the output Q of the SR latch 411 changes to a high state, too. While the gate output Gout(N+1) continuously remains in a low state, although the gate output Gout(N−1) changes to a low state again, the output Q of the SR latch 411 does not change. While the gate output Gout(N−1) remains in a low state, the gate output Gout(N+1) changes to a high state, then the output Q of the SR latch 411 changes to a low state. The output Q of the SR latch 411 remain in a high state from a point of time that the previous gate output Gout(N−1) changes to a high state from a low state to a point of time that the later gate output Gout(N+1) changes to a high state from a low state. However, the output Q of the SR latch 411 remains in a low state except the duration.

The AND gate 412 generates a gate output Gout(N) of a high state if both the output Q of the SR latch 411 and the clock signal CK1 are in a high state. More in detail, when the gate output Gout(N) remains in a high state and the clock signal changes to a high state from a low state, the gate output Gout(N) changes to a high state. However, when the clock signal CK1 changes to a low state or the output Q of the SR latch 411 changes to a low state, the gate output Gout(N) changes to a low state, too.

In this way, each shift register 410 generates the gate output Gout(N) based on the gate output Gout(N−1) of the previous shift register and the gate output Gout(N+1) of the following shift register, and in synchronization with one of the clock signals CK1 and CK2. Adjacent shift registers 410 receive a different one of the clock signals CK1 and CK2, respectively. The clock signals CK1 and CK2 each have an opposite phase. The gate output Gout(N) is applied to the gate lines for turning on the switching elements Q1 and Q2.

Figure 5:
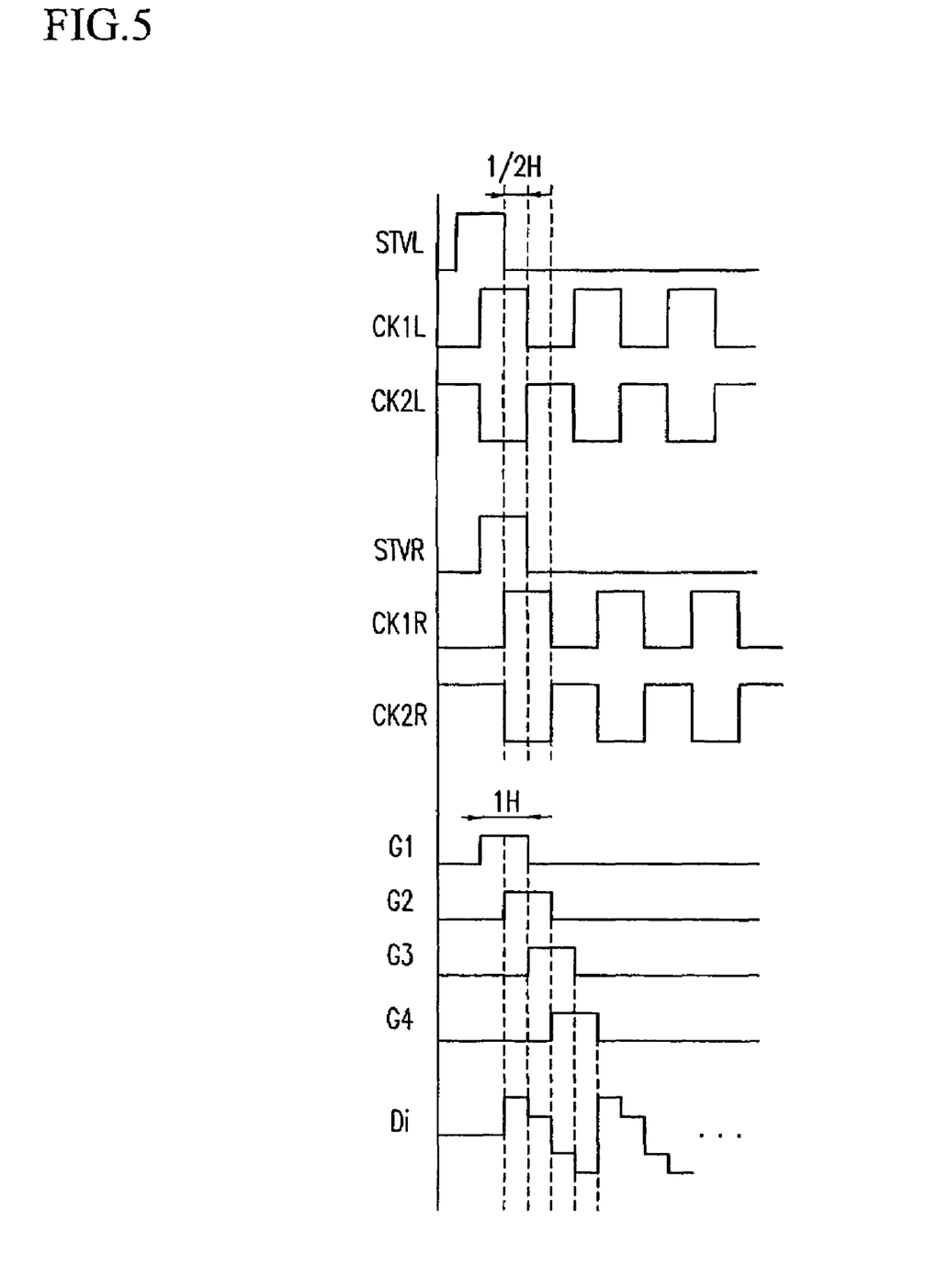
FIG. 5 is a waveform diagram for illustrating operation of a display driving device according to an embodiment of the present invention.

FIG. 5 is a waveform diagram according to an embodiment of the present invention. The signal controller 600 applies the vertical synchronization start signal STVL to the gate driver 400L first, and after the elapsed time of ½ H, it applies the vertical synchronization start signal STVR to the gate driver 400R. At the same time, the signal controller 600 applies the clock signals CK1L and CK2L to the gate driver 400L, and after the elapsed time of ½ H, it applies the clock signals CK1R and CK2R to the gate driver 400R. For example, the gate drivers 400L and 400R operate with an interval of ½ H when the vertical synchronization start signals STVL and STVR and the clock signals CK1L, CK1R, CK2L and CK2R are applied with an interval of ½

H, respectively. Then, the duration of a high state becomes 1 H and the adjacent gate signals are overlapped during ½ H.

The data driver 500 applies the data voltages to the pixels connected to the left and right of the data line Di, and each time for applying the data voltages to pixels connected to the gate drivers 400L and 400R is ½ H. For example, the gate-on voltage Von is applied to one gate line during 1 H and the data voltage is applied during the latter ½ H of 1 H. Therefore, total time for applying the data voltages to pixels connected to the gate drivers 400L and 400R is 1 H.

Figure 6:
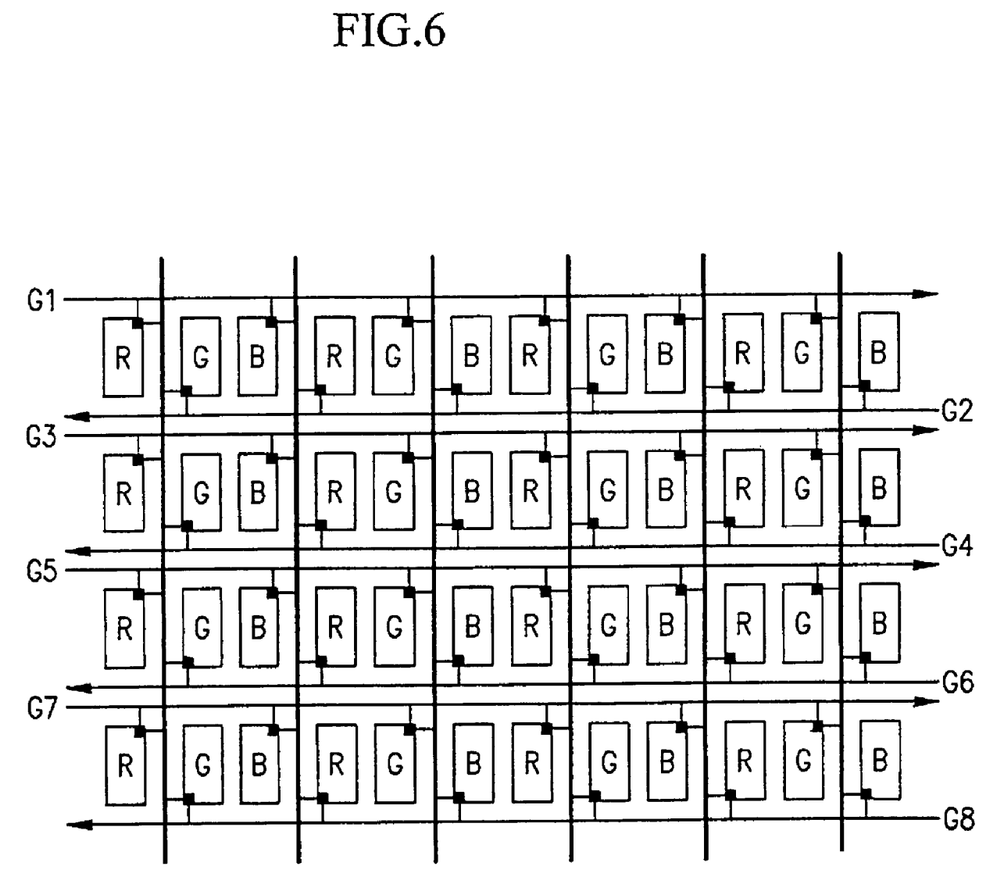
FIG. 6 is a layout of pixels in the LCD device according to an embodiment of the present invention.

FIG. 6 is a layout according to an embodiment of the present invention. As shown in FIG. 6, pixels with the same color are connected to the same gate drivers 400L and 400R. For example, red pixels R in the first column are all connected to the gate driver 400L and green pixels G in the second column are all connected to the gate driver 400R. In this way, it is possible to minimize display distortion owing to delay of the gate signal by connecting the pixels with the same color arranged up and down to the same gate drivers 400L and 400R.

As two pixels are connected to one data line, the signal controller 600 stores data in a row to a line memory, and then, divides the data into data of pixels connected to the odd gate lines G1, G3, . . . and data of pixels connected the even gate lines G2, G4, . . . and supplies them to the data driver 500.

Furthermore, the data driver 500 applies data voltages with opposite polarities each other to the left and the right pixels connected to one data line. In this manner, it is possible to reduce cost of the data driving ICs by sharing the data line and an output buffer (now shown) with two pixels and perform the dot inversion capable of implementing high quality.

According to the present invention, the shift register 410 is formed together with the switching element Q of the pixel to reduce the number of the gate driving ICs. Also, it is possible to implement lower shift speed than that of a shift register made of poly silicon and to apply the data voltages at the substantially same speed as the shift register made of poly silicon.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A liquid crystal display apparatus comprising:
   a liquid crystal panel assembly including:
     a plurality of pixels arranged in a matrix form, the plurality of pixels including a first group of pixels and a second group of pixels;
     a plurality of gate lines having a first group of gate lines and a second group of gate lines that are connected with the first group of pixels and the second group of pixels, respectively; and
     a plurality of data lines each of which is connected with one of the first group of pixels and one of the second group of pixels in every row of the matrix form;
   a signal controller that receives input image signals and generates two groups of image data;
   a data driver that receives the two groups of image data and provides data voltages corresponding to the image data to the plurality of data lines; and
   a gate driving unit including a first gate driver that provides first gate-on signals to the first group of gate lines and a second gate driver that provides second gate-on signals to the second group of gate lines,
   wherein the signal controller generates a first group of control signals being applied to the first gate driver, and a second group of control signals being applied to the second gate driver, the first group of control signals are each overlapped with corresponding one of the second group of control signals for a predetermined time interval, and
   wherein the first and second groups of control signals each includes a vertical synchronization start signal and clocks.

2. The liquid crystal display apparatus of claim 1, wherein each of the second group of pixels is disposed between adjacent ones of the first group of pixels in every row of the matrix form.

3. The liquid crystal display apparatus of claim 1, wherein the first and second gate drivers each include a plurality of shift registers, each of the shift registers having an input connected to an output of a previous one of the shift registers and another input connected to an output of a following one of the shift registers, the shift registers each receiving at least one clock.

4. The liquid crystal display apparatus of claim 3, wherein the shift registers each include:
   an SR latch having inputs connected to the outputs, respectively, of the previous and following shift registers; and
   an AND gate having an input connected to an output of the SR latch and another input receiving a clock.

5. The liquid crystal display apparatus of claim 1, wherein the two groups of image data are odd data and even data.

6. The liquid crystal display apparatus of claim 1, wherein the clocks have a different phase.

7. The liquid crystal display apparatus of claim 6, wherein the vertical synchronization start signal is overlapped with the clocks for a predetermined time interval.

8. The liquid crystal display apparatus of claim 5, wherein the odd and even data are applied to the data driver during a half horizontal period.

9. The liquid crystal display apparatus of claim 8, wherein the odd and even data have an opposite polarity.

10. The liquid crystal display apparatus of claim 1, wherein the plurality of pixels have switching elements, and the first and second gate drivers and the switching elements are formed on a same substrate.

11. A display driving device, comprising:
    a signal controller that generates first and second groups of control signals and divides input image signals into two groups of image data;
    data drivers that are supplied with the two groups of image data and output data voltages corresponding to the two groups of image data; and
    gate drivers each including shift registers each of which is supplied with the first and second groups of control signals and at least one output of an adjacent one of the shift registers to output a gate-on signal,
    wherein the first and second groups of control signals each have a vertical synchronization start signal and at least one clock, the first group of control signals being each overlapped with corresponding one of the second group of control signals for a predetermined time interval.

12. The display driving device of claim 11, wherein the gate drivers include first and second groups of gate drivers, the first and second groups of gate drivers being disposed at opposing regions with respect to each other.

13. The display driving device of claim 12, wherein the first and second groups of gate drivers apply the gate-on signal to odd gate lines and even gate lines, respectively.

14. The display driving device of claim 11, wherein the two groups of image data are even and odd data.

15. A method of driving a liquid crystal display device, comprising:
providing first gate-on signals via a first group of gate lines and second gate-on signals via a second group of gate lines;
providing data voltages via data lines;
providing first control signals and first clock signals to a first gate driver providing the first gate-on signal to the first group of gate lines;
providing second control signals and second clock signals to a second gate driver providing the second gate-on signals to the second group of gate lines about a half horizontal period after providing the first control signals and the first clock signals to a first gate driver;
providing the first gate-on signals to a first group of switching elements connected to the data lines;
providing the second gate-on signals to a second group of switching elements connected to the date lines about a half horizontal period after providing the first gate-on signals to a first group of switching elements; and
providing the data voltages to the first and second group of switching elements, wherein the first control signals include a first vertical synchronization start signal, and the second control signals include a second vertical synchronization start signal which is overlapped with the first vertical synchronization start signal during a predetermined time interval.

16. The method of claim 15, wherein the first gate-on signals are each overlapped with corresponding one of the second gate-on signals for a predetermined time interval.

17. The method of claim 16, wherein the first and second gate-on signals are provided for a horizontal period.

* * * * *